United States Patent
Sivaramakrishnan et al.

(10) Patent No.: US 8,332,729 B2
(45) Date of Patent: Dec. 11, 2012

(54) SYSTEM AND METHOD FOR AUTOMATIC COMMUNICATION LANE FAILOVER IN A SERIAL LINK

(75) Inventors: Ramaswamy Sivaramakrishnan, San Jose, CA (US); Sebastian Turullols, Los Altos, CA (US); Stephen E. Phillips, Los Gatos, CA (US)

(73) Assignee: Oracle International Corporation, Redwood City, CA (US)

(*) Notice: Subject to any disclaimer, the term of this patent is extended or adjusted under 35 U.S.C. 154(b) by 1108 days.

(21) Appl. No.: 12/239,960

(22) Filed: Sep. 29, 2008

(65) Prior Publication Data
US 2010/0083066 A1 Apr. 1, 2010

(51) Int. Cl.
*H03M 13/00* (2006.01)

(52) U.S. Cl. ........ 714/776; 714/710; 714/718; 711/154; 365/63

(58) Field of Classification Search .......................... None
See application file for complete search history.

(56) References Cited

U.S. PATENT DOCUMENTS

| | | | |
|---|---|---|---|
| 7,756,123 B1* | 7/2010 | Huang et al. | 370/359 |
| 7,782,805 B1* | 8/2010 | Belhadj et al. | 370/300 |
| 2007/0011536 A1* | 1/2007 | Khanna et al. | 714/733 |
| 2007/0011549 A1* | 1/2007 | Sharma | 714/746 |
| 2008/0005706 A1* | 1/2008 | Sharma et al. | 716/4 |
| 2009/0141731 A1 | 6/2009 | Bitar | |
| 2009/0182916 A1 | 7/2009 | Inagawa et al. | |
| 2009/0187683 A1* | 7/2009 | Adar et al. | 710/58 |
| 2010/0281315 A1* | 11/2010 | Vogt et al. | 714/710 |

* cited by examiner

*Primary Examiner* — Albert Decady
*Assistant Examiner* — Justin R Knapp
(74) *Attorney, Agent, or Firm* — Meyertons, Hood, Kivlin, Kowert & Goetzel, P.C.; Stephen J. Curran

(57) ABSTRACT

A system for automatic lane failover includes a first device coupled to a second device via a serial communication link having a plurality of a communication lanes. The devices may communicate by operating the link in a normal mode and a degraded mode. During normal mode operation, the devices may send frames of information to each other via the serial communication link. Each frame of information may include a number of data bits and a number of error protection bits. In response to either device detecting a failure of one or more of the communication lanes, the first device may cause the serial communication link to operate in a degraded mode by removing the one or more failed communication lanes. In addition, each device may reformat and send the frame of information on the remaining communication lanes with fewer data bits and the same number of error protection bits.

20 Claims, 5 Drawing Sheets

| | Lane | | | | | | | |
|---|---|---|---|---|---|---|---|---|
| | 13 | 12 | 11 | • • • | 3 | 2 | 1 | 0 |
| 0 | X | X | D119 | | D23 | D11 | C23 | C11 |
| 1 | X | X | | | D22 | D10 | C22 | C10 |
| 2 | X | X | | | | | | |
| 3 | X | X | | | | | | |
| 4 | X | D127 | | • | | | | |
| 5 | X | D126 | | • | | | | |
| 6 | X | | | | | | | |
| 7 | X | | | | | | | |
| 8 | X | | | | | | | |
| 9 | X | | | | | | | |
| 10 | X | | | | | | | |
| 11 | X | D120 | D108 | | D12 | D0 | C12 | C0 |

|    | Lane |      |      |     |      |      |     |     |
|----|------|------|------|-----|------|------|-----|-----|
|    | 13   | 12   | 11   | ••• | 3    | 2    | 1   | 0   |
| 0  | D143 | D131 | D119 |     | D23  | D11  | C23 | C11 |
| 1  |      |      |      |     | D22  | D10  | C22 | C10 |
| 2  |      |      |      |     |      |      |     |     |
| 3  |      |      |      |     |      |      |     |     |
| 4  |      |      |      | •   |      |      |     |     |
| 5  |      |      |      | •   |      |      |     |     |
| 6  |      |      |      |     |      |      |     |     |
| 7  |      |      |      |     |      |      |     |     |
| 8  |      |      |      |     |      |      |     |     |
| 9  |      |      |      |     |      |      |     |     |
| 10 |      |      |      |     |      |      |     |     |
| 11 | D132 | D120 | D108 |     | D12  | D0   | C12 | C0  |

FIG. 3A

|    | Lane |      |      |     |      |      |     |     |
|----|------|------|------|-----|------|------|-----|-----|
|    | 13   | 12   | 11   | ••• | 3    | 2    | 1   | 0   |
| 0  | X    | X    | D119 |     | D23  | D11  | C23 | C11 |
| 1  | X    | X    |      |     | D22  | D10  | C22 | C10 |
| 2  | X    | X    |      |     |      |      |     |     |
| 3  | X    | X    |      |     |      |      |     |     |
| 4  | X    | D127 |      | •   |      |      |     |     |
| 5  | X    | D126 |      | •   |      |      |     |     |
| 6  | X    |      |      |     |      |      |     |     |
| 7  | X    |      |      |     |      |      |     |     |
| 8  | X    |      |      |     |      |      |     |     |
| 9  | X    |      |      |     |      |      |     |     |
| 10 | X    |      |      |     |      |      |     |     |
| 11 | X    | D120 | D108 |     | D12  | D0   | C12 | C0  |

FIG. 3B

SYSTEM AND METHOD FOR AUTOMATIC COMMUNICATION LANE FAILOVER IN A SERIAL LINK

BACKGROUND OF THE INVENTION

1. Field of the Invention

This invention relates to serial communication and, more particularly, to automatic lane failure recovery.

2. Description of the Related Art

Highly available computer systems require fault tolerance on components that are likely to fail. Of the many components in a system, interconnects between devices may be subject to one or more lanes of a communication link failing. For example, serial communication links using bundled serializer/deserializer (SerDes) lanes may experience lane failures. In some systems, a lane failure may take down the entire link. In other systems, a lane failure may require software intervention to recover. However, software recovery mechanisms cannot generally prevent a system failure. The software recovery mechanism is usually triggered on a reboot, during which the software recovery mechanism may reconfigure the hardware. Thus software intervention may not be a satisfactory solution. Further, in some systems, recovery may include a operating with degraded error protection capabilities. Thus, many of the conventional recovery mechanisms available today do not meet many of the requirements of a highly reliable system.

SUMMARY

Various embodiments of a system and method for automatic lane failover in a serial communication link are disclosed. In one embodiment, the system includes a first device coupled to a second device via a serial communication link. The serial communication link includes a plurality of communication lanes. The first device and the second device are configured to communicate by operating the serial communication link in a normal mode and a degraded mode. During operation in the normal mode, the first device and the second device may send frames of information to each other via the serial communication link. The frame of information may include a number of data bits and a number of error protection bits. In response to either the first device or the second device detecting a failure of one or more of the communication lanes, the first device is configured to cause the serial communication link to operate in a degraded mode by remapping the plurality of communication lanes to unmap the one or more failed communication lanes. In addition, each device may reformat and send the frame of information on the remaining communication lanes such that the number of data bits is reduced and the number of error protection bits is unchanged.

In one specific implementation, the first device may switch the serial communication link from the normal mode to the degraded mode automatically and without software intervention.

BRIEF DESCRIPTION OF THE DRAWINGS

FIG. 3A is a diagram illustrating an embodiment of a frame of information transmitted via the serial communication link of FIG. 1 in a normal mode.

FIG. 3B is a diagram illustrating an embodiment of a frame of information transmitted via the serial communication link of FIG. 1 in a degraded mode.

Figure 1:
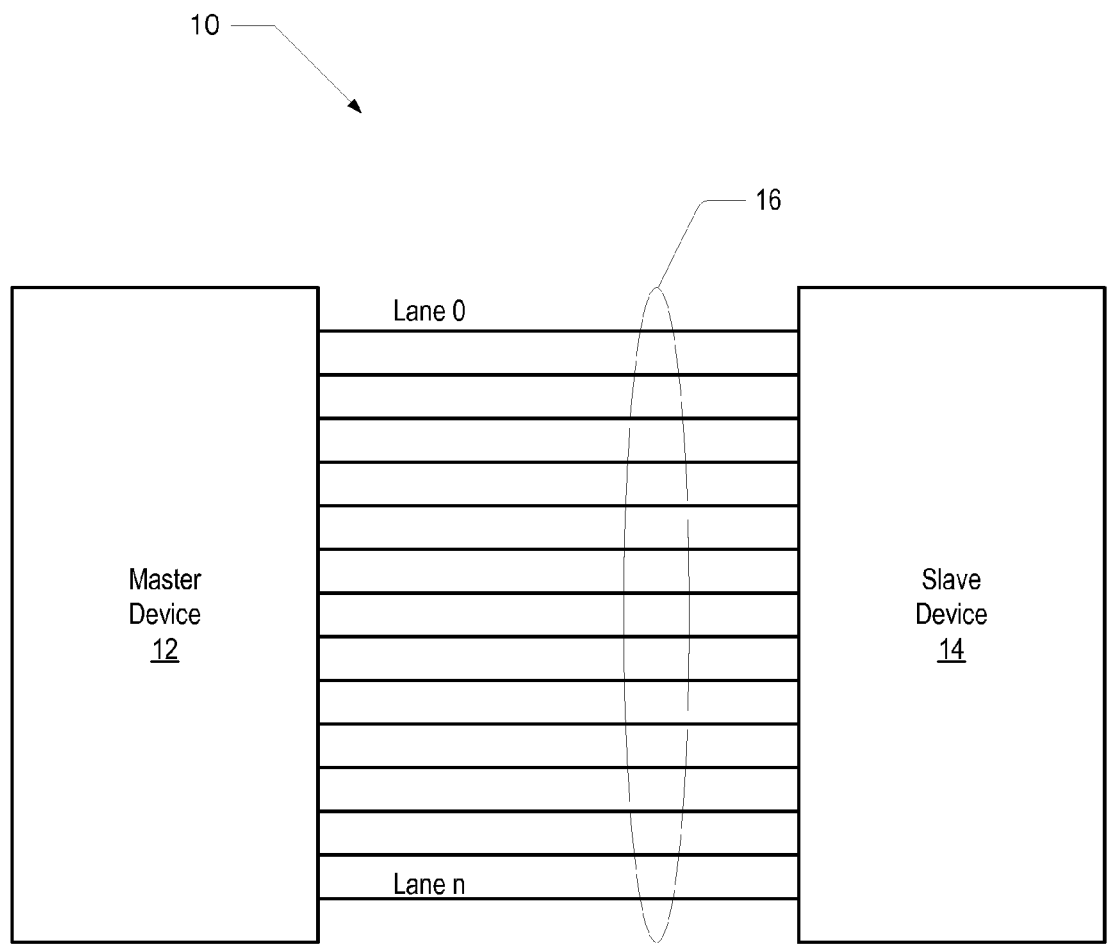
FIG. 1 is a block diagram of one embodiment of a system including devices interconnected by a serial communication link.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a system including devices interconnected by a serial communication link is shown. The system 10 includes a master device 12 coupled to a slave device 14 via a serial communication link 16. As shown, the link 16 includes a number of communication lanes designated lane 0 through lane n, where n may be any number.

In one embodiment, the master device 12 and the slave device 14 may both be processor devices configured to communicate to enable coherency operations. However, in other embodiments, master device 12 and slave device 14 may be any type of device that may communicate serially for any reason.

Figure 2:
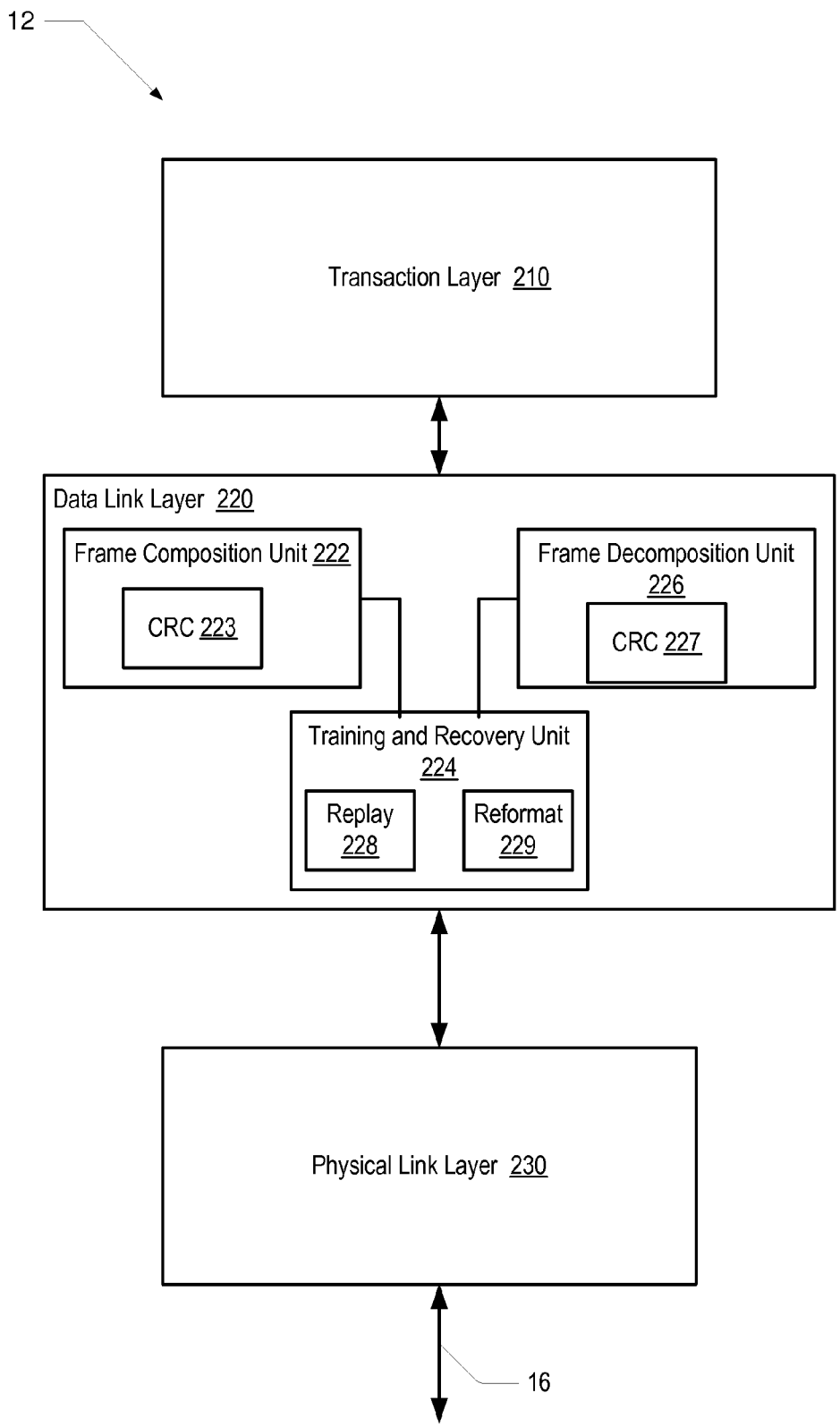
FIG. 2 is a diagram depicting further details of one embodiment of the devices of FIG. 1.

Accordingly, as shown in FIG. 2, each of master device 12 and slave device 14 may include a transaction layer 210, a data link layer 220, and a physical link layer 230. In one embodiment, the transaction layer 210 may comprise messages passed between devices to communicate memory and I/O requests, for example.

The data link layer 220 may provide a reliable and resilient means of passing messages between devices. In one embodiment, the data link layer 220 may be configured to build fixed sized frames that are a convenient unit of transmission over the physical link. These frames include variable sized messages (e.g., data payload bits) and link control information. The link control information may include error protection bits such as cyclic redundancy code (CRC) check bits, for example, to detect frame errors. As will be described further below, special link control frames may be used for requesting frame retransmission and other link maintenance functions.

In the illustrated embodiment, data link layer 220 includes a frame composition unit 222, a frame decomposition unit 226, a training and recovery unit 224. The training and recovery unit 224 includes a replay buffer 228 and a frame reformatter 229.

The physical layer 230 may include the physical communication link 16. In one embodiment, the link includes 14 transmit and 14 receive SERDES lanes that are bundled into transmit and receive channels. Each lane may be configured to send and receive 12 bits per frame interval. Thus, the link may be configured to send and receive 168-bit frames, of which, 24 bits may be CRC bits and 144 bits may be data, for example. The physical layer 230 may also include features for clock recovery, bit/symbol alignment, initialization, and training.

As depicted in FIG. 2, the data link layer 220 accepts/delivers messages from/to the transaction layer and sends/receives frames to/from the physical layer. Logically, the data link layer 220 may be divided into three major functions: frame composition, frame decomposition, and link training/recovery. In one embodiment, the frame composition unit 222 may be configured to format outgoing messages into frames, where each frame spans the link. The frame decomposition unit 226 may be configured to process incoming frames and extract incoming messages. The link training and recovery unit 224 may be configured to perform tasks such as initial link configuration, ongoing training, and error recovery, for example.

In one embodiment, during a normal mode of operation outgoing messages may be received by the frame composition unit 222. The frame composition unit 222 may format each frame to have 144 data payload bits. Each formatted frame may be stored within the replay buffer 228 before it is transmitted by the physical layer 230. The CRC unit 223 calculates the CRC bits and appends 24 CRC bits to the 144-bit payload, thus creating a 168-bit frame that is sent to the physical layer 230. As described further below, if the receiver of the message (e.g., slave device 14) detects an error, the receiver may request a retransmission. If this occurs, the frame stored in the replay buffer 228 will be sent again. In addition, depending on the status of the link 16 (e.g., in a degraded state), the frame reformatter 229 may reformat the frame stored within the replay buffer 228 to have fewer data bits and the same number of CRC bits, prior to transmission. More particularly, the frame reformatter 229 may format the frame to have only 128 data bits. The CRC unit 223 calculates the CRC bits for the 128-bit data payload and appends 24 CRC bits to the 128-bit payload creating a 152-bit frame that is then sent to the physical layer 230. FIG. 3A illustrates a 168-bit normal mode frame and FIG. 3B illustrates a 152-bit degraded mode frame.

Turning to the embodiment shown in FIG. 3A, the normal mode frame is formatted for a 14-lane serial link 16. As such, the normal mode frame includes 14, 12-bit frame boundaries. As shown, the CRC bits comprise 3 bytes or 24 bits beginning at bit 11 of lane 0 and ending at bit 0 of lane 1. The 144-bit data payload begins at bit 11 of lane 2, and extends to bit 0 of lane 13.

Referring to the embodiment of FIG. 3B, the degraded mode frame formatting includes 128 data payload bits (e.g., D0-D127) and 24 bits of CRC. Similar to the frame of FIG. 3A, the CRC bits are still located in all 12 bits of lane 0 and lane 1. Thus, the frame has a full strength error protection capability. However, the data bits stop at bit 4 of lane 12. Indeed, in one embodiment, regardless of which lane may fail, the frame is reformatted this same way, and as described further below in conjunction with the descriptions of FIG. 4A through FIG. 4C, the physical layer hardware connections may be manipulated so that each frame is transmitted and received correctly.

Figure 4A:
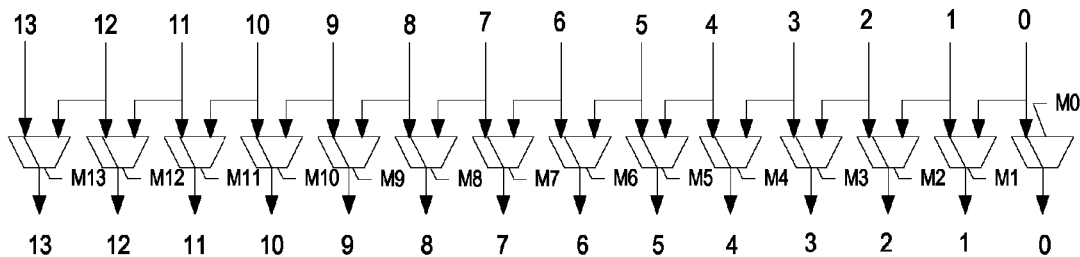
FIG. 4A is a diagram showing one embodiment of a logical to physical mapping of communication lanes of the serial communication link of FIG. 1 in a normal mode.

Turning to FIG. 4A, a diagram of one embodiment of a normal mode transmitter logical to physical lane mapping is shown. In one embodiment, the hardware includes a multiplexer (mux) for each physical lane. As such, there are 14 muxes, designated M0 through M13. As shown, and beginning with mux M0, each logical lane is coupled to the correspondingly numbered mux and also to the next higher numbered mux to the left. The output of each mux represents the physical lane, and is so numbered. Accordingly, as described further below, if a lane failure is detected the hardware may automatically remap the logical to physical mapping such that the failed physical lane is not used. In one embodiment, hardware simply switches certain muxes to use the other input.

Figure 4B:
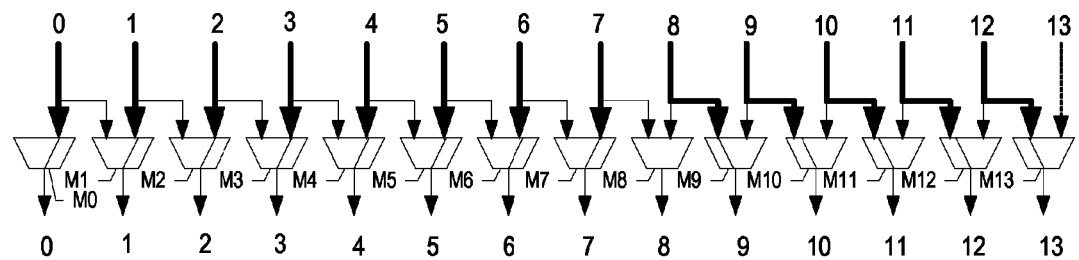
FIG. 4B is a diagram showing one embodiment of a transmitter logical to physical mapping of communication lanes of the serial communication link of FIG. 1 in a degraded mode.

Referring to FIG. 4B, a diagram of one embodiment of degraded mode transmitter logical to physical lane mapping is shown. Similar to the embodiment shown in FIG. 4A, the embodiment shown in FIG. 4B also includes a multiplexer (mux) for each physical lane. As such, there are 14 muxes, designated M0 through M13. As shown, physical lane 8 is failed (as indicated by the dashed line). Accordingly, the frame may be reformatted as shown in FIG. 3B, such that there is no data to transmit via logical lane 13. As shown, the logical to physical lane mappings are unchanged from normal mode mappings for lanes 0 through lane 7. However, due to the failed physical lane 8, mux 8 is no longer used and all the logical lane mappings from lane 8 through 12 are shifted one position, to the next higher number (via, for example, the mux switching). Thus, logical lane 8 is now routed through mux 9 to physical lane 9, logical lane 9 is routed through mux 10 to physical lane 10, and so forth. At mux 13, logical lane 12 is routed through mux 13 to physical lane 13 because as described above there is no data in the frame for lane 13.

Figure 4C:
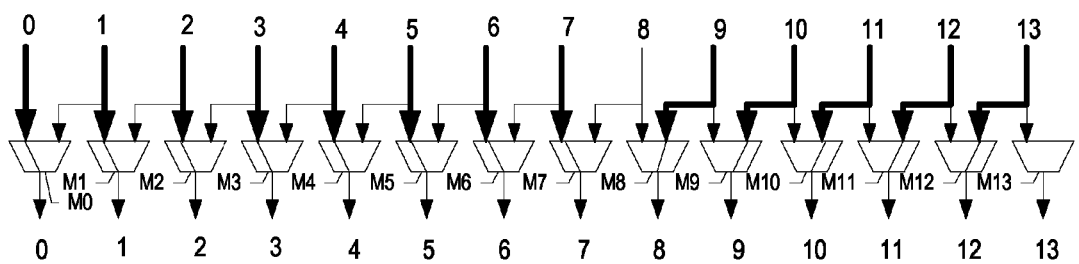
FIG. 4C is a diagram showing one embodiment of a receiver physical to logical mapping of communication lanes of the serial communication link of FIG. 1 in a degraded mode.

Referring to FIG. 4C, a diagram of one embodiment of degraded mode receiver physical to logical lane mapping is shown. Similar to the embodiment shown in FIG. 4A, the embodiment shown in FIG. 4B also includes a multiplexer (mux) for each physical lane. As such, there are 14 muxes, designated M0 through M13. However, in FIG. 4C, the output of each mux represents the logical lanes. In the illustrated embodiment, physical lane 8 is failed (as indicated by the dashed line). Thus, reformatted frames are sent across the physical link 16. Accordingly, since there is no data in the reformatted frame for lane 13, logical lane 13 and so mux 13 is not used. Thus, the physical lane to logical lane is remapped (via, for example, the mux switching). As such, physical lane 13 may be routed through mux 12 to logical lane 12, physical lane 12 is routed through mux 11 to logical lane 11, and so forth until physical lane 9 is routed through mux 8 to logical lane 8. In addition, similar to above, the lane mapping does not change for physical and logical lanes 0-7. Thus, the data can be received in the same degraded mode frame format that it was transmitted without loss of error protection strength, and without significant bandwidth loss as may be experienced using some conventional failover techniques.

Figure 5:
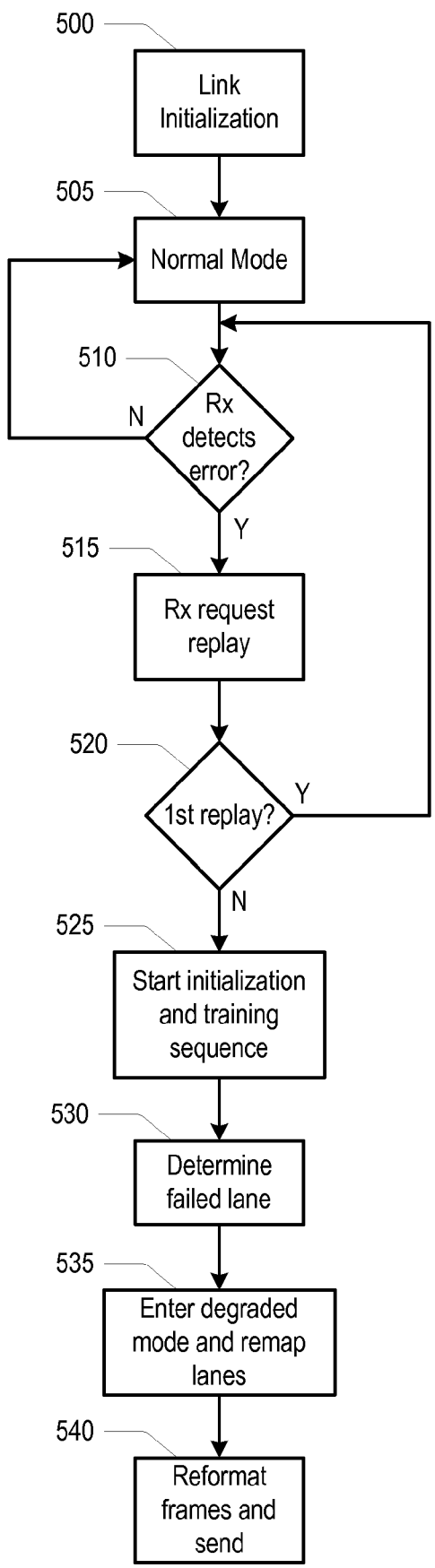
FIG. 5 is a flow diagram describing the operation of the embodiments depicted in FIG. 1 through FIG. 4C.

Turning to FIG. 5, a flow diagram describing the operation of the embodiments of FIG. 1 through FIG. 4C is shown. Referring collectively to FIG. 1 through FIG. 5 and beginning in block 500 of FIG. 5 the link is initialized. For example in one embodiment, the training and recovery unit 224 within the master device 12 may automatically initiate a training sequence which may include a handshake-type protocol with the receiver in the slave device 14. During initialization, one or more predetermined patterns may be sent to ensure proper operation of the physical link 16. If during the initialization errors are detected, the link may enter a degraded mode of operation as described further below.

Once the initialization is complete, the link may enter a normal operational mode (block 505). During normal operation, the receiver of a message may regenerate the CRC bits and compare them to the received CRC bits to check for the presence of errors (block 510). If no errors are detected, normal operation continues. However, if an error is detected, the receiver may request via, for example, a control frame, that the transmission be replayed (block 515). Accordingly, the transmitter may resend the frame that was held in the replay buffer 228. If the replay is the first replay (block 520), the receiver again checks the received frame for errors, and if an error is detected while the receiver is waiting for a resume, the receiver may either initiate an initialization and recovery sequence directly, if it is a master device 12, or notify the master device 12 by driving an electrical idle, for example on the link. This may cause the master device 12 to initiate link recovery and an initialization and training sequence to retrain the link hardware (block 525). The initialization and training sequence may identify a faulty or "bad" lane (block 530). Accordingly, the link may enter the degraded mode and the bad lane may be removed from service and the physical to logical and logical to physical mappings may be remapped (block 535). For example, the training and recovery unit 224 may cause connections in the physical layer 230 to be remapped. More particularly, as described above in conjunction with the descriptions of FIG. 4B and FIG. 4C, the failed physical lane is shifted over such that the high order physical lanes are shifted down or up over the failing lane, depending on whether it is a receive or transmit function. In addition, it appears that logical lane 13 is always broken. This is because in the degraded mode, a lane's worth of data (e.g., 12 bits) is lost. However, as shown above in FIG. 3B, 16 bits are actually discarded, which may allow for an integer number of bytes to be properly aligned. As shown in FIG. 3B, the high order nibble of lane 12 is also discarded. In one embodiment, the discarded bits may be zero for CRC calculations.

The link is now operating in the degraded mode (block 540). Once the lanes have been remapped, each frame is reformatted on the fly, prior to transmission, as long as the link is operated in the degraded mode (block 545). For example, in one embodiment, the frame may be formatted as an 18-byte frame, and before it is transmitted, the link state may be checked. If the link is in a degraded mode, the frame is reformatted into a 16-byte frame and transmitted. At the receiver, the inverse reformatting may be performed to recover the 16-byte formatted frame.

It is noted that although the above embodiments are shown to include failover for a single lane failure, it is contemplated that in other embodiments, additional remapping and reformatting hardware may be used to recover from other numbers of lane failures.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a first device;
a second device coupled to the first device via a serial communication link, wherein the serial communication link includes a plurality of a communication lanes;
wherein the first device and the second device are configured to communicate by operating the serial communication link in a normal mode and a degraded mode;
wherein during operation in the normal mode, the first device and the second device send frames of information to each other via the serial communication link, wherein the frame of information includes a number of data bits and a number of error protection bits;
wherein in response to either the first device or the second device detecting a failure of one or more of the plurality of communication lanes, the first device is configured to cause the serial communication link to operate in a degraded mode by remapping the plurality of communication lanes to unmap the one or more failed communication lanes, and to reformat and send the frame of information on the remaining communication lanes such that the number of data bits is reduced and the number of error protection bits is unchanged; and
wherein the first device is configured to switch the serial communication link from the normal mode to the degraded mode automatically and without software intervention.

2. A system comprising:
a first device; and
a second device coupled to the first device via a serial communication link, wherein the serial communication link includes a plurality of a communication lanes;
wherein the first device and the second device are configured to communicate by operating the serial communication link in a normal mode and a degraded mode;
wherein during operation in the normal mode, the first device and the second device send frames of information to each other via the serial communication link, wherein the frame of information includes a number of data bits and a number of error protection bits;
wherein in response to either the first device or the second device detecting a failure of one or more of the plurality of communication lanes, the first device is configured to cause the serial communication link to operate in a degraded mode by remapping the plurality of communication lanes to unmap the one or more failed communication lanes, and to reformat and send the frame of information on the remaining communication lanes such that the number of data bits is reduced and the number of error protection bits is unchanged; and
wherein each of the first and the second devices is configured to detect an error in the information using the error protection bits, and in response to detecting the error to request a replay of the transmission.

3. The system as recited in claim 2, wherein in response to detecting an error in the replayed frame of information, each of the first and the second devices is configured to cause an initialization and training sequence to determine which of the plurality of communication lanes is faulty.

4. The system as recited in claim 3, wherein the first device comprises a master device and the second device comprises a slave device, wherein the master device is configured to initiate the initialization and training sequence and the slave device is configured to notify the master device to initiate the initialization and training sequence.

5. The system as recited in claim 1, wherein each of the first device and the second device is configured to map each of a plurality of logical communication lanes to a respective one of the plurality of communication lanes during operation in the normal mode.

6. The system as recited in claim 5, wherein in response to determining which of the plurality of communication lanes is faulty, each of the first device and the second device is configured to deactivate a highest numbered logical communication lane regardless of which of the plurality of communication lanes is faulty.

7. The system as recited in claim 6, wherein in response to determining which of the plurality of communication lanes is faulty, each of the first device and the second device is further configured to shift up the logical communication lane connections of a transmitter portion of each of the first and second device, and to shift down the communication lane connections in a receiver portion of each of the first and second device such that the faulty communication lane is unused.

8. The system as recited in claim 1, wherein during operation in the degraded mode, each of the first device and the second device is configured to reformat each frame of information to be transmitted by removing all the data bits from a highest numbered logical lane and a portion of the data bits from a next lower numbered logical lane.

9. A method comprising:
operating a serial communication link in a normal mode by sending a frame of information from a first device to a second device via the serial communication link, wherein the serial communication link includes a plurality of communication lanes, and wherein the frame of information includes a number of data bits and a number of error protection bits;
detecting a failure of one or more of the plurality of communication lanes;
operating the communication link in a degraded mode by remapping the plurality of communication lanes to unmap the one or more failed communication lanes, and reformatting and sending the frame of information on the remaining communication lanes such that the number of data bits is reduced and the number of error protection bits is unchanged; and
switching from normal mode to degraded mode automatically and without software intervention.

10. A method comprising:
operating a serial communication link in a normal mode by sending a frame of information from a first device to a second device via the serial communication link, wherein the serial communication link includes a plurality of communication lanes, and wherein the frame of information includes a number of data bits and a number of error protection bits;
detecting a failure of one or more of the plurality of communication lanes;
operating the communication link in a degraded mode by remapping the plurality of communication lanes to unmap the one or more failed communication lanes, and reformatting and sending the frame of information on the remaining communication lanes such that the number of data bits is reduced and the number of error protection bits is unchanged; and
detecting an error in the information using the error protection bits, and in response to detecting the error requesting a replay of the transmission.

11. The method as recited in claim 10, wherein in response to detecting an error in the replayed frame of information, causing an initialization and training sequence to determine which of the plurality of communication lanes is faulty.

12. The method as recited in claim 11, wherein the first device comprises a master device and the second device comprises a slave device, wherein the master device initiating the initialization and training sequence and the slave device notifying the master device to initiate the initialization and training sequence.

13. The method as recited in claim 9, further comprising mapping each of a plurality of logical communication lanes to a respective one of the plurality of communication lanes during operation in the normal mode.

14. The method as recited in claim 13, wherein in response to determining which of the plurality of communication lanes is faulty, deactivating a highest numbered logical communication lane regardless of which of the plurality of communication lanes is faulty.

15. The method as recited in claim 14, wherein in response to determining which of the plurality of communication lanes is faulty, shifting up the logical communication lane connections of a transmitter portion of each of the first and second device, and shifting down the communication lane connections in a receiver portion of each of the first and second device such that the faulty communication lane is unused.

16. The method as recited in claim 9, wherein during operation in the degraded mode, reformatting each frame of information to be transmitted by removing all the data bits from a highest numbered logical lane and a portion of the data bits from a next lower numbered logical lane.

17. A system comprising:
means for operating a serial communication link in a normal mode by sending a frame of information from a first device to a second device via the serial communication link, wherein the serial communication link includes a plurality of communication lanes, and wherein the frame of information includes a number of data bits and a number of error protection bits;
means for detecting a failure of one or more of the plurality of communication lanes;
means for operating the communication link in a degraded mode by remapping the plurality of communication lanes to unmap the one or more failed communication lanes, and reformatting and sending the frame of information on the remaining communication lanes such that the number of data bits is reduced and the number of error protection bits is unchanged; and
means for switching from normal mode to degraded mode automatically and without software intervention.

18. The system as recited in claim 17, further comprising means for detecting an error in the information using the error protection bits, and in response to detecting the error, means for requesting a replay of the transmission.

19. The system as recited in claim 18, further comprising means for causing an initialization and training sequence to determine which of the plurality of communication lanes is faulty in response to detecting an error in the replayed frame of information.

20. The system as recited in claim 17, further comprising means for reformatting, during operation in the degraded mode, each frame of information to be transmitted including removing all the data bits from a highest numbered logical lane and a portion of the data bits from a next lower numbered logical lane.

* * * * *